Patented Oct. 9, 1923.

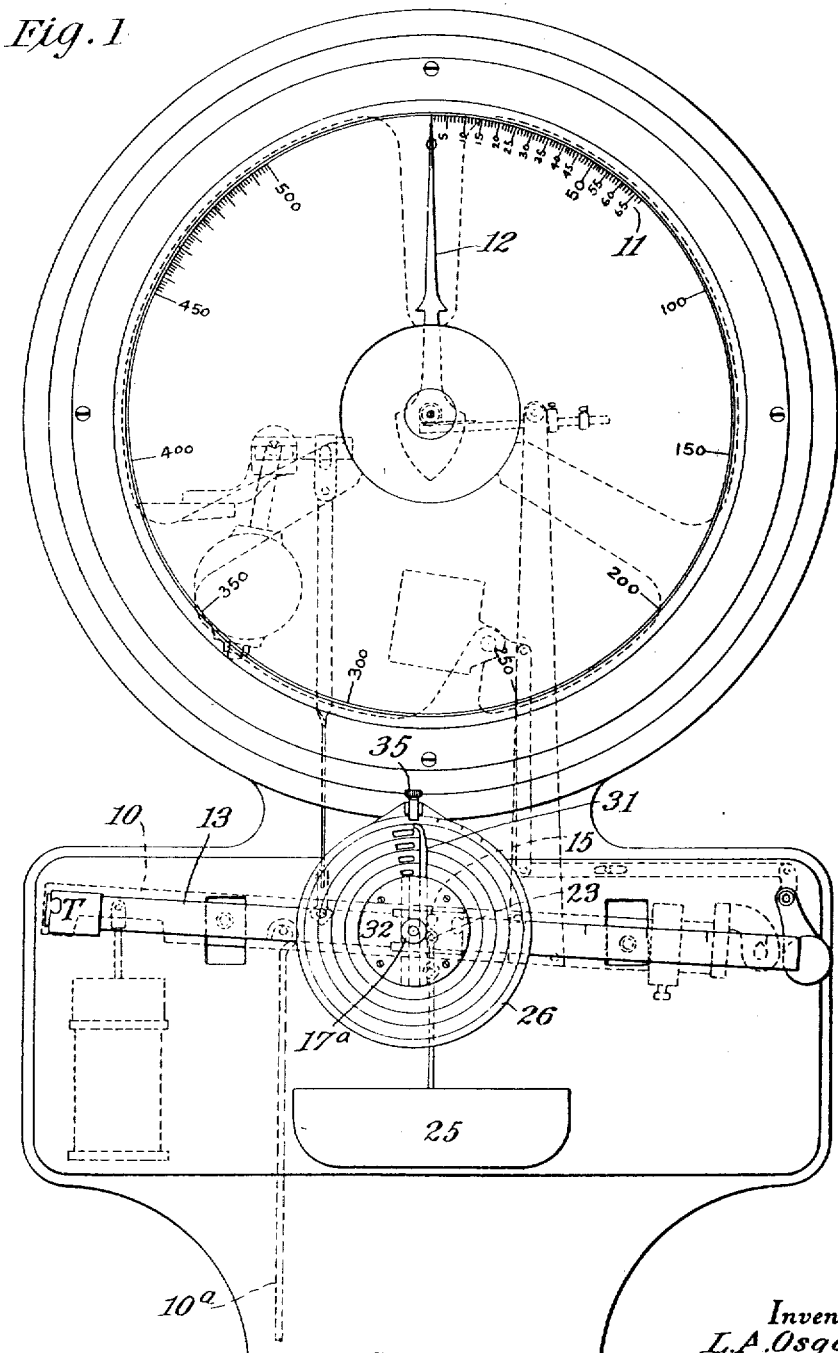

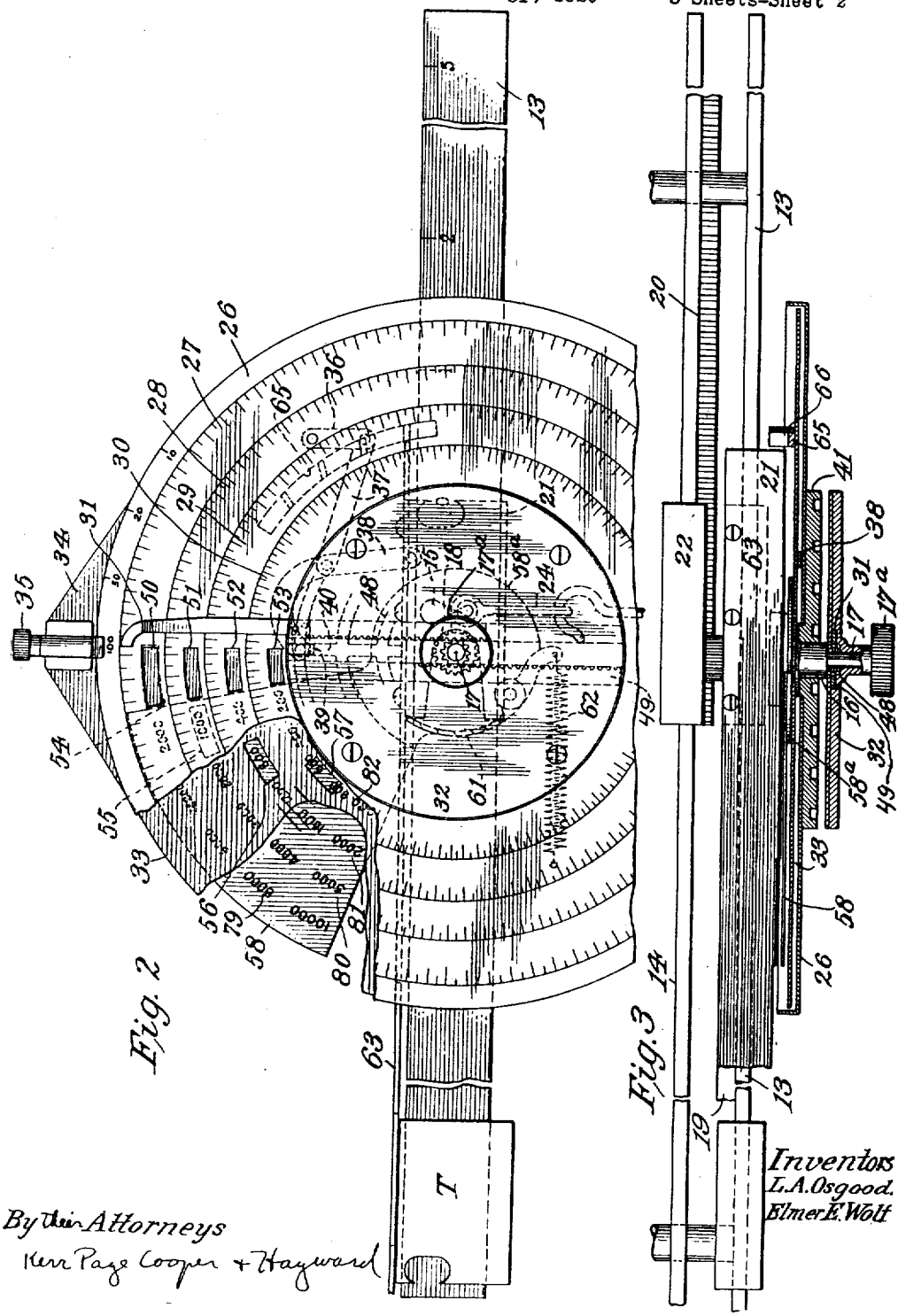

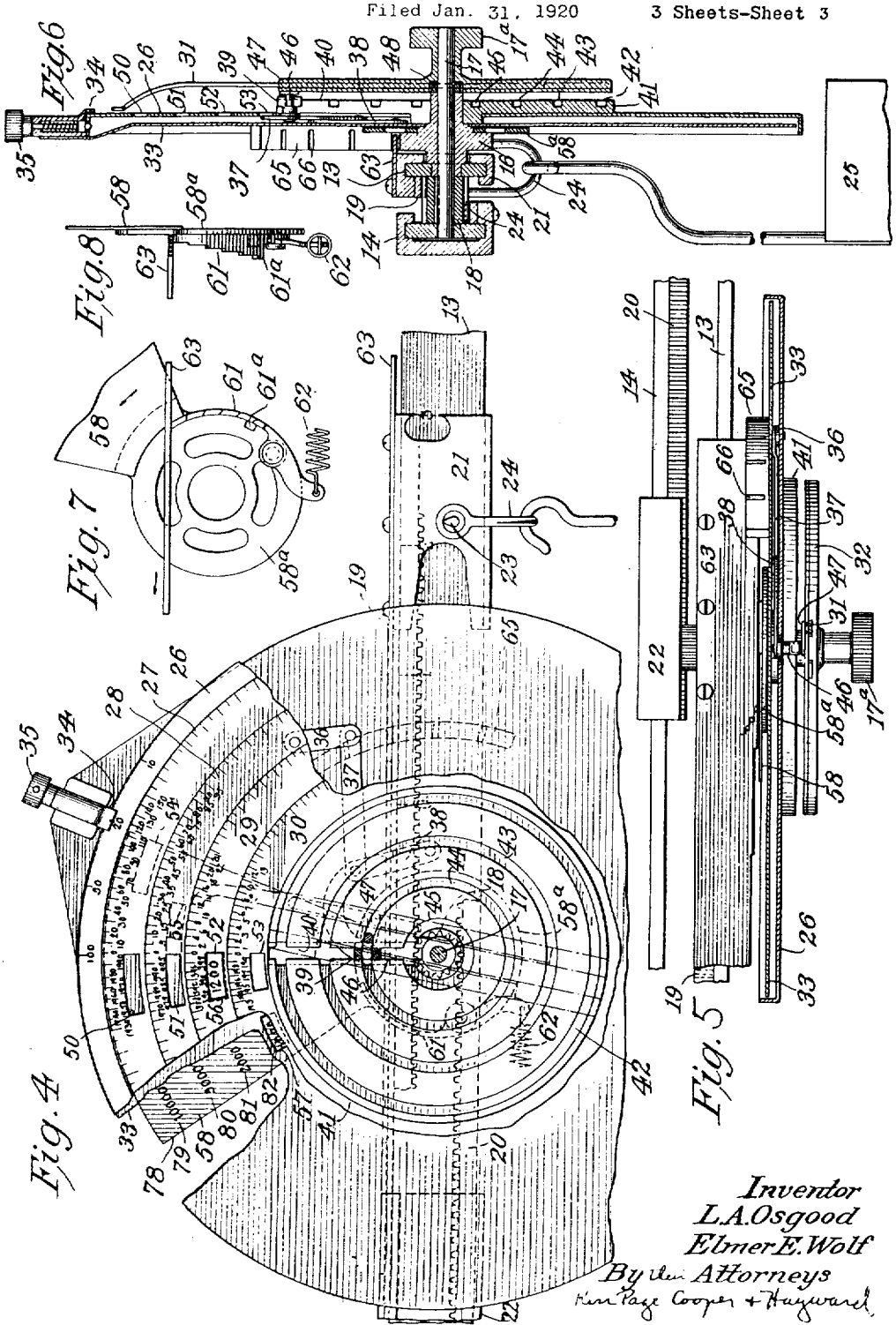

1,470,025

UNITED STATES PATENT OFFICE.

LOUIS A. OSGOOD, OF DAYTON, AND ELMER E. WOLF, OF SPRINGFIELD, OHIO, ASSIGNORS TO INTERNATIONAL SCALE COMPANY, OF DAYTON, OHIO, A CORPORATION OF ILLINOIS.

COUNTING DEVICE FOR SCALES.

Application filed January 31, 1920. Serial No. 355,452.

*To all whom it may concern:*

Be it known that we, LOUIS A. OSGOOD and ELMER E. WOLF, both citizens of the United States, OSGOOD residing at Dayton, Montgomery County, State of Ohio, and WOLF residing at Springfield, Clark County, State of Ohio, have invented certain new and useful Improvements in Counting Devices for Scales, of which the following is a full, clear, and exact description.

The object of the present invention is to provide an apparatus for the attachment to a scale to provide means for counting the number of articles upon the scale platform or for determining accurately when a desired number of articles of substantially uniform weight have been placed upon the platform.

Like other counting scales the device embodies a receiver in which a definite number of articles may be placed to form a counterbalance weight. Means are provided for adjusting the position of the receiver upon the beam to any desired position and for simultaneously moving a poise on the beam to counterbalance the weight of the receiver, whereby the weight of the articles in the receiver alone reacts against the beam.

The present invention resides in the improvement of construction of counting scales of the type embodying a shiftable weight receiver and poise in which rack and pinions are used for effecting the displacement of the parts. These scales may be provided with indicating devices in the form of dials having multiple graduated scales and provided with a cooperating pointer. One of the objects of the present invention is particularly directed to means for setting the pointer to sweep over the desired scale and in the association with such means of an index device which designates the number of articles to be placed in the receiver for a particular setting of the index and for a corresponding position of the pointer.

In this type of counting scales such means as racks and pinion are provided for manually setting the position of the receiver which obviates the use of cords and pulleys or right and left hand screws. In the present embodiment use is made of this setting device. The present embodiment also utilizes the multiple dial and cooperating pointer to determine the count as shown in the application referred to above.

Another object resides in the provision of a supplementary dial which is arranged to show a number corresponding to the total count represented by one revolution of the pointer, and this count number is progressively increased each time the pointer is turned through one complete revolution. The index device and supplemental dial are so arranged that the proper count will be displayed by the supplementary dial at each revolution of the pointer, regardless of the setting of the index and the position of the pointer.

The total count is displayed at the dial by the turning of a single knob and the use of doubling or slip-on weights is obviated, thereby minimizing the possibility of error which is attendant upon the mental calculation necessary when they are used.

Other objects reside in certain details of construction which will hereafter be set forth in further detail.

In the drawings,

Fig. 1 shows a scale having our counting device applied thereto.

Fig. 2 shows a front plan view of the dials and the scale beam.

Fig. 3 is a top plan view of the scale beams with the dials shown in central horizontal section.

Fig. 4 is a detail view of the dials with parts broken away to show the interior construction, and with the index in moved position.

Fig. 5 is a top plan view similar to Fig. 3, with the dial and shutter shown in central section.

Fig. 6 is a detail vertical sectional view taken through the center of the counting attachment when the same is in the position shown in Fig. 1. This view shows the relations of the dials and poises, racks and the pinions which operate the same.

Fig. 7 is a detail fragmentary view of the supplementary dial and means for moving and variably arresting its movement.

Fig. 8 shows a side elevation view of the parts shown in Fig. 7.

The scale to which our invention is applied is of the type shown and described in the copending application of L. A. Osgood Serial No. 105,903, filed June 26, 1916. It comprises having the usual draft rod 10ª suspended therefrom which connects with the base lever system. The draft rod transmits a force in proportion to the weight of articles weighed to the beam 10. To indicate the weight there is the usual weight indicator or pointer 12 which pointer is suitably connected with beam 10.

Outside of the case at the front is a structure which is connected to move in unison with the main scale beam 10. This structure consists of two longitudinally disposed parallel counting beams 13 and 14. The counting beams are connected together and to the main scale beam by suitable brackets. It will be understood that this structure together with the main scale beam is pivotally supported upon pivots 15.

Fixed to beam 13 is a stud 16 (see Fig. 6) which forms a sleeve support for a shaft 17. This shaft at one end carries a knurled knob 17ª and at the other has secured thereto a pinion 18 which is adapted to mesh with an upper, downwardly facing rack 19 and a lower upwardly facing rack 20. Rack 19 is fastened to a receiver poise 21 which is slidably shiftable on beam 13, and rack 20 connects with a counterbalancing poise 22 which is slidably shiftable on beam 14. Poise 21 carries a knife edge 23 (see Figs. 1 and 4) which supports, through a trig loop 24, a receiver 25 (see Figs. 1 and 6). From Fig. 1, it will be apparent that with the parts in normal position the weight of the receiver will not exert any force on the main scale beam, inasmuch as knife edge 23 is directly under knife edge 15, the main fulcrum point of the beam. Since the receiver hangs on the line of the main fulcrum point of the beam, the weight of the articles therein will also not affect the balance of the scale when the parts are in normal position.

In the counting operation a number of articles are first placed on the platform. If a container is used for these articles the weight of the container is tared off in the usual manner by tare poise T slidable on beam 13. A certain number 100, 50, 20 or 10, of the articles are then placed in the receiver 25. The knurled knob 17ª is then turned clockwise, advancing rack 19, container poise 21 and receiver 25 to the right, and rack 20 and counterbalancing poise 22 to the left. The weight of poise 22 is such that it is adapted to just counterbalance the weight of receiver 25, and receiver poise 21. The receiver and receiver poise 21 therefore exert no unbalanced force on the main scale beam irrespective of their position thereon.

The weight of the articles in the receiver, however, does exert a force upon the beam, the amount of the force depending upon the number of articles in the receiver, their weight and the position of the receiver on the beam.

Knob 17ª is manually turned clockwise until the receiver is shifted to such a point as to cause the weight of the articles therein to exert just sufficient force on the main scale beam to overcome the pull due to the weight of the articles on the scale platform. This restores the main lever and the weight indicating devices to normal zero position. It will be understood that the knob 17ª is turned until pointer 12 is restored to zero position on scale 11 (see Fig. 1).

From the foregoing it will be apparent that the distance the container 25 has moved to the right from normal position will be a measure of the count of the articles on the platform. In order to read this count we provide a dial mechanism which will now be described.

Fixed to stationary stud 16 is a circular count-dial 26, having four rows of graduations or scales 27, 28, 29 and 30. A pointer 31 is mounted so as to rotate in unison with the rotation of knob 17ª. As shown in Figs. 5 and 6, the pointer 31 is slidably mounted in a slot in a disc 32 which is fixed so as to rotate with knob 17ª. Scale 27 has 2000 graduations, 28 has 1000, 29 has 400, and 30 has 200 graduations, and these scales are adapted to cooperate with the pointer 31 to show the count of articles which will be counterbalanced by 100, 50, 20 or 10 articles placed in the receiver. For example if 100 articles are placed in the receiver the knob 17ª and pointer 31 are turned 360° to bring the main scale weight indicator to zero, the pointer 31 will stand opposite the 2000 mark on scale 27, thereby indicating that there are 2000 articles on the platform.

In order to set the pointer so that its tip extends to a particular scale corresponding to the particular number of articles placed in the receiver, we provide means for advancing or retracting the pointer radially outwardly from shaft 17 and for concurrently counterbalancing the pointer. This setting means also performs other functions which will hereafter be described. Rotatable about stud 16 is a shutter plate 33 which at the upper part of its periphery carries an index 34 which extends over the periphery of dial 26. The index is provided with a spring plunger 35 forming a retaining device adapted to cooperate with holes in the turned over periphery of dial 26 (see Fig. 6). By pulling outwardly upon plunger 35 and shifting the same circumferentially, the index 34 can be aligned with the figures 100, 50, 20 or 10, on the periphery of fixed dial 26. These numbers designate the particular number of articles to be placed in the receiver for that setting of the index. When the index 34 is moved to its various positions, the pointer 31 is moved automatically by the movement of the index so that its end is adapted to sweep over the particular scale corresponding to the selected index position and the number of articles in the receiver. To effect this setting of the pointer we provide a link 36 having one end loosely mounted upon a pin carried by fixed disc 26 (see Fig. 4). The opposite end of link 36 is connected by a pin connection to a second link 37 which at its opposite end is bowed and provided with a suitable stud which secures a shoe 39 thereto. Intermediate the ends, link 37 has a pin connection with a link 38 which at its lower end has a pin connection to shutter 33.

By the movement of index 34, linkage 36, 37, 38 causes shoe 39 to slide vertically in a vertical slot 40 in a member 41 which is fastened to stud 16 (see Figs. 4, 5, 6). Upon the outer face of member 41 are a number of concentric circular slots or grooves 42, 43, 44 and 45, and these slots are at such position as to align with the center of the shoe when the index is moved to different number positions. With index at 100 the shoe will be opposite slot 42, at 50 position the shoe will be opposite slot 43, at 20 position the shoe will be opposite slot 44, and at 10 position the shoe will be opposite slot 45. The inner face (i. e., towards member 40) is grooved with a circumferential groove which is similar in size to grooves 42, 43, 44 and 45. Within this grooved part of the shoe is a pin 46 which pin is fastened to a short link 47 which is rigidly fastened to pointer 31 (see Figs. 5 and 6). The movement of the shoe up and down will impart a corresponding movement of the pointer 31 through the pin 46 and link 47. In this way the pointer is brought to sweep over a particularly scale 27, 28, 29 or 30, corresponding with index positions 10, 20, 50 and 100. After the pointer has been adjusted it may be freely rotated by turning the knob 17ª. In this rotation the pin 46 moves in the particular slot 42, 43, 44 or 45 opposite which it has previously been positioned. After once setting the index 34 and turning knob 17ª the pointer cannot be brought to a different scale position until the parts are restored to normal position. In order to counterbalance the pointer we provide rack teeth on the side of the pointer which teeth mesh with and rotate a small pinion 48 which is freely rotatable on shaft 17. Pinion 48 meshes with a rack 49 which is guided for a sliding vertical movement in member 32 so that as the pointer 31 moves outwardly rack 49 moves outwardly or vice versa to thereby effect a counterbalance of the pointer irrespective of its position.

In order to provide means for indicating on the dial the count when knob 17ª is turned through more than one revolution, we provide means for indicating the gross count figures corresponding to one or more revolutions adjacent the zero point of the scales on dial 26. The construction is such that the showing of the supplemental amount or gross figures appears immediately after the pointer 31 passes the zero position. It is not desirable to have these figures appear gradually as there is a possibility of error in the reading when they so appear. Furthermore the means provides for the progressive appearance of gross count figures representing the gross units adjacent all four of the scales on dial 26.

Referring to Figs. 2 and 4, fixed dial 26 has four windows 50, 51, 52, 53, directly to the left of the zero point of scales 27, 28, 29 and 30, and below the graduation as shown in Fig. 4. Shutter 33 has likewise four windows 54, 55, 56, 57, which are staggered with respect to each other. The location of these windows is such that with index in the 100 position as shown in Fig. 2 windows 50 and 54 will align and when the index is moved to the 50, 20 and 10 positions, respectively, windows 55, 56 and 57 will progressively align with windows 51, 52 and 53 and permit a reading to be made of numbers on a supplementary dial 58. It will be understood that with one setting two windows only are aligned permitting a single reading of the numerals upon supplementary dial 58 which corresponds to the particular setting of the index 34.

Supplementary dial 58 carries four concentric rows of gross count figures 79, 80, 81 and 82, representing the gross counts corresponding to the amount represented by one revolution of the pointer over scales 27, 28, 29 and 30. Each row of figures is made up of a series of progression of gross count figures corresponding to 1, 2, 3, 4 and 5 revolutions of the pointer. Supplementary dial 58 is of sector shape and is fastened to a disc 58ª which is rotatably mounted upon stud 16 (see Fig. 6). Pivoted upon a stud 60 carried by disc 58ª is a stepped tooth segment 61 which has fastened thereto a tension spring 62 suitably fastened at its opposite end to a fixed part of the device or if desired to shutter 33. The stepped tooth segment 61 is prevented from swinging inwardly by a stop 61ª but can swing outwardly against the tension of the spring.

Fastened to the receiver poise is a flat plate 63 which is likewise provided with a stepped edge. The distance between the steps corresponds to the distance poise 21 moves for one rotation of knob 17ª.

Stepped tooth segment 61 cooperates with the edge of plate 63 so that when the plate is moved a distance corresponding to one revolution of the knob the stepped segment will swing up under the influence of spring 62 and engage the first step with the first step on plate 63.

The rotation of the stepped segment causes the supplementary dial to move to a proper extent to display the proper gross count through the previously aligned windows. Upon the return movement of the parts the stepped segment swings away from the stop 61ª thereby freeing the steps of the segment from the steps of plate 63 and permitting the return of the poise and other parts to normal position.

It is desirable to prevent the movement of the index after the knob 17ª is partially turned and until it is restored to normal position. This is accomplished by means of a sector shaped plate 65 having a plurality of notches 66 on the periphery. This plate 65 is fastened to the shutter 33 and upon movement of the knob 17ª the plate 63 projects into the notches and thereafter prevents a movement of the shutter by the index until the parts are restored to normal position.

We claim:—

1. In a counting scale in which counting is effected by shifting a counterbalanced receiver containing a predetermined number of articles to a position to oppose and counterbalance the load of the articles to be counted, in combination a receiver, a count indicating device including a dial element and a pointer element, one of which elements is movable relatively to the other element, means for moving the movable element in unison with the movement of the receiver, and means for displaying a gross count representing accumulated totals of one or more complete dial counts when the capacity of the aforesaid dial is exceeded.

2. In a counting scale in which counting is effected by shifting a counterbalanced receiver containing a predetermined number of articles to a position to oppose and counterbalance the load of the articles to be counted, in combination a receiver, a count indicating device including a dial element and a pointer element, one of which elements is movable relatively to the other element, means for moving the movable element in unison with the movement of the receiver, and means for displaying a gross count representing accumulated totals of one or more complete dial counts when the capacity of the aforesaid dial is exceeded, said dial element being provided with a plurality of graduated scales, the graduations of the different scales corresponding with the count of the articles on the scale or counterbalanced by varied but predetermined numbers of articles.

3. In a counting scale in which counting is effected by shifting a counterbalanced receiver containing a predetermined number of articles to a position to oppose and counterbalance the load of the articles to be counted, in combination a receiver, a count indicating device including a dial element and a pointer element, one of which elements is movable relatively to the other element, means for moving the movable element in unison with the movement of the receiver, and means for displaying a gross count representing accumulated totals of one or more complete dial counts when the capacity of the aforesaid dial is exceeded, said means including a supplementary dial disposed adjacent the first mentioned dial for displaying the gross count when the capacity of first mentioned count indicating device is exceeded by the movable element completing one or more rotations.

4. In a counting scale in which counting is effected by shifting a counterbalanced receiver containing a predetermined number of articles to a position to oppose and counterbalance the load of the articles to be counted, in combination a receiver, a count indicating device including a dial element and a pointer element, one of which elements is movable relatively to the other element, means for moving the movable element in unison with the movement of the receiver, and means for displaying a gross count representing accumulated totals of one or more complete dial counts when the capacity of the aforesaid dial is exceeded, said means including a supplementary dial adapted to progressively move at substantially the exact time the movable element of the first mentioned count indicating device completes a revolution, said supplementary dial being thereby adapted to display the gross count expressed by the complete revolutions of the movable element.

5. The invention set forth in claim 3 in which the supplementary dial is provided with a plurality of rows of figures representing varying gross counts, the different rows representing the gross count as counterbalanced by a varied but predetermined number of articles in the receiver.

6. The invention set forth in claim 2, in which the means for displaying the gross counts comprises a supplementary dial having a plurality of rows of figures thereon representing different gross counts, the gross count in each said row on the supplementary dial corresponding to a particular row on the graduated dial and representing the count run up by the movable and stationary elements of the count indicating device in completing one or more relative rotations with respect to that one particular row.

7. The invention set forth in claim 1, in which means is provided for preventing the movement of the gross count displaying device until the movable element of the count indicating device has passed a predetermined point.

8. The invention set forth in claim 2, in which means is provided for moving the pointer element to align with any desired graduated scale on the dial.

9. The invention set forth in claim 2, in which means is provided for moving the pointer element to align with any desired graduated scale on the dial and in which the pointer setting means is adapted to also control the display of the gross count, whereby the corresponding gross count figures will show which relate to the particular scale selected.

10. The invention set forth in claim 2, in which means is provided for moving the pointer element to align with any desired graduated scale on the dial and in which the said pointer setting means is adapted to set an index to show the particular number of articles to be placed in the receiver when that setting is used.

11. The invention set forth in claim 1, in which means is provided for setting an index for controlling the display of gross count figures, said index being also adapted to show the number of articles to be placed in the receiver for that particular setting.

12. In a device of the class described, a fixed counting dial having a plurality of scales thereon, a movable pointer adapted to sweep over the dial, a gross count displaying device adapted to progressively display gross counts of accumulated totals of the dial counts as the pointer swings through complete revolutions, means for adjusting the pointer to cooperate with a particular scale on the counting dial and means adapted to adjust the gross count displaying device so that it will display the gross counts corresponding to the scale swept over by the pointer.

13. In a counting scale, in which counting is effected by shifting a counterbalanced receiver containing a predetermined number of articles in a position to oppose and counterbalance the load of the articles to be counted, in combination, a receiver, a counting dial having a plurality of scales corresponding with varied numbers of articles in the receiver, a pointer cooperating therewith and movable in unison with the movement of the receiver, and means for setting the pointer in accordance with the number of articles in the receiver.

14. The invention set forth in claim 3, in which a shutter is provided having openings therein through which the gross counts are displayed.

15. The invention set forth in claim 3, in which a shutter is provided having a series of openings therein through which the count figures upon the supplementary dial are displayed, and means for shifting said shutter in accordance with the number of articles to be placed in the receiver whereby the proper gross count figures are displayed for the number of articles in the receiver.

16. The invention set forth in claim 2, in which the dial is provided with a number of openings adjacent the zero point of the graduated scales, and in which means are provided for displaying the gross count through a particular opening and obscuring the reading through the other openings.

17. In a counting scale in which counting is effected by shifting a counterbalanced receiver containing a predetermined number of articles to oppose and counterbalance the load of the articles to be counted, in combination, a receiver, a graduated dial element and pointer element, one of said elements being movable relatively to the other to display the count, a plurality of graduated scales upon said dial and means for displaying through said dial gross counts representative of the count with respect to a particular graduated scale by the movable element in completing one or more revolutions, said figure being displayed adjacent the zero of the scale on the dial whereby the reading of the gross count and the pointer and dial count show the total count of articles upon the scale.

18. The invention set forth in claim 3, in which the dial is provided with an opening through which the gross count is displayed and in which a shutter is provided to obscure the opening when the number of articles does not correspond to the gross count to be properly displayed through that opening.

19. In a counting scale, a gross count displaying device comprising a supplementary dial, a main dial, having openings therein and an intermediate shutter, an article receiver, means for moving the supplementary dial a predetermined amount after the receiver has moved a certain distance, and means for moving the shutter to display a certain scale to view and obscure others, said means being set in accordance with the number of articles to be placed in the receiver.

In testimony whereof we affix our signatures.

LOUIS A. OSGOOD.
ELMER E. WOLF.